UNITED STATES PATENT OFFICE.

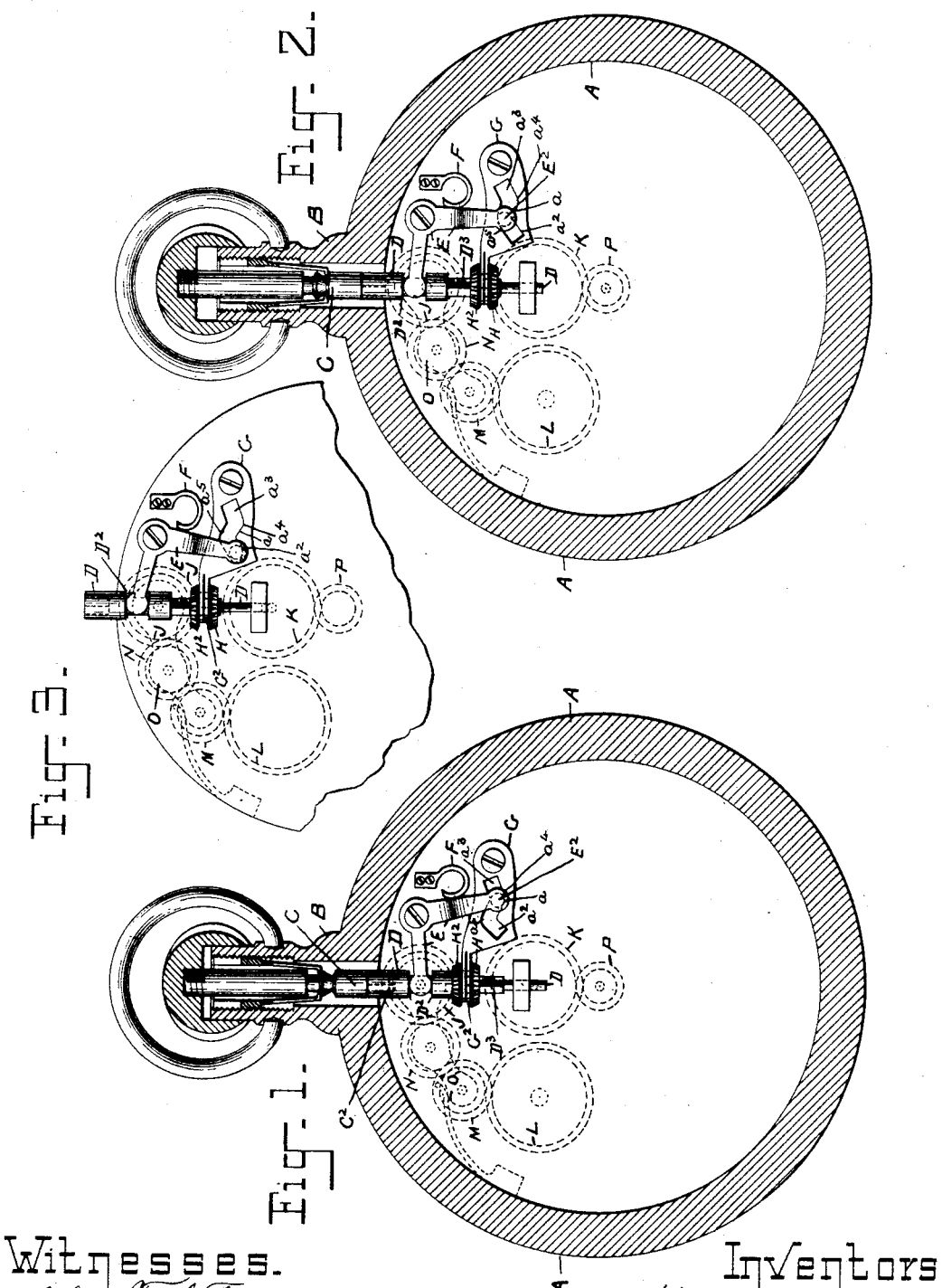

WILLIAM M. MATHESON AND MELVIN L. BISHOP, OF WALTHAM, MASSACHUSETTS.

STEM WINDING AND SETTING WATCH.

SPECIFICATION forming part of Letters Patent No. 541,561, dated June 25, 1895.

Application filed April 5, 1895. Serial No. 544,643. (No model.)

*To all whom it may concern:*

Be it known that we, WILLIAM M. MATHESON, a subject of Her Majesty the Queen of Great Britain, and MELVIN L. BISHOP, a citizen of the United States of America, residing at the city of Waltham, in the county of Middlesex and State of Massachusetts, have invented certain new and useful Improvements in Stem-Winding and Hand-Setting Watches, of which the following is a full, clear, and exact description.

This invention in a stem and hand set for watch-movements, consists, in substance, in combination with a case pendant-stem of the usual, or other suitable character, of a stem in the movement rotated and pushed in by the pendant-stem and moving out as the pendant-stem is pulled out, an angular-lever backed by a spring and engaging the movement-stem, a lever having an annular running cam-slot in engagement with said angular-lever, and a pinion sliding on and rotating with the movement-stem and engaged by said cam-slotted lever and arranged to mesh a wheel of the wind and a wheel of the set, according as the pendant-stem is pushed in, or pulled out, and all otherwise, as hereinafter fully appears.

In the drawings forming part of this specification, Figures 1 and 2 are similar face views of the mechanism of this invention as located in a watchcase, shown in section. Fig. 1 shows the mechanism as in the wind and Fig. 2 shows it as in the set. Fig. 3 is a face view, in detail, of the mechanism out of the watchcase and in the wind.

In the drawings, A is the case-center or rim.

B is the case-pendant and $c$ is the case pendant-stem or arbor, to slide and rotate all as usual and well known and of themselves forming no part of this invention.

D is the movement-stem suitably supported to rotate and to slide lengthwise. The movement-stem D is in continuation of the pendant-stem C and the square-sided end $C^2$ of the pendant-stem C enters into a correspondingly square-sided socket of the movement-stem all so that the pendant and movement-stems turn as one and the pendant-stem can be moved in and out of the movement-stem.

$D^2$ is a groove around the movement-stem, receiving one end of an angular-lever E which is backed by a spring F. The other end of this lever has a stud, or pin $E^2$, engaging the angular running or cam-slot, in three parts $a$, $a^2$ and $a^3$, continuous with each other, of a lever G. The arm $G^2$ of the lever G is split lengthwise as shown and engages the groove around a pinion, in two parts, H, $H^2$, and on the square-sided portion $D^3$ of the movement-stem. This pinion is located between a wheel J of the wind and a wheel K of the set and by sliding it on the movement-stem it is meshed with either one or the other thereof, but not with both at the same time.

The several parts above described are normally in the wind, and with the pendant-stem pushed in, it is in the wind, and with the pendant-stem pulled out it is in the set, and when removed from the case it returns to the wind.

The operation of the mechanism is as follows: Pushing in the stem swings the angular-lever E against its spring F, and the angular-lever swings the cam-slot lever and this lever slides the pinion H, $H^2$, into mesh with the wheel J of the wind, where it remains and is held and the stud of the angular-lever then rests at $a^4$ which is the lowest point of the cam-slot, between its parts $a$ and $a^3$. Pulling out the pendant-stem, releases the movement-stem to be returned by the action of the spring F on the angular-lever and the swing of the angular-lever swings the cam-slot lever and thus the pinion is moved from the wheel J of the wind to the wheel K of the set. The stud $E^2$ of the angular-lever moves through the part $a$ of the cam-slot and rests at $a^5$, which is the highest point of the cam-slot between its parts $a$ and $a^2$ and the pinion remains and is held in the set. When the movement is removed from the case, the spring F, being freed to act, throws the angular-lever so that its stud enters into the part $a^2$ of the cam-slot and thus the cam-slot lever is moved to carry the pinion into mesh with the wheel J of the wind. The part $a^3$ of the cam-slot permits, on pushing in the pendant-stem, movement of the angular-lever, to work the case-spring and all without effect on the wind, the pinion H, H² then being in mesh with the wheel J of the wind. Splitting the lever as explained admits of its being adjusted to properly fit the groove of the pinion to obviate all possibility of lost motion.

The gear J of the wind communicates with the winding-wheel L through intermediate gears M and N supported on an oscillating-yoke O which is hung on the gear J all as well known. The gear K of the hand-set meshes the cannon-pinion P.

The several parts of the mechanism described are at the dial side of the watch-movement and are to be carried by the plate back of the dial in a manner obvious without explanation.

On removal of the hands and dial all parts of the winding and hand-set of this invention are free to be removed and replaced at pleasure while the watch is in motion, or going, and again without taking down the movement, the latter feature being of much importance especially in high grade movements adjusted to position.

The part $a^3$ of the cam-slot is not required if there is no case-spring.

Having thus described our invention, what we claim, and desire to secure by Letters Patent, is—

1. In a stem-wind and hand-set for watch movements, in combination, a rotating and sliding stem D, an angular-lever E engaging the stem, and a lever G having a cam-slot engaged by the angular-lever, and a sliding-pinion H, H² on and rotating with the stem D and engaged by the cam-slot lever, substantially as described, for the purpose specified.

2. In a stem-wind and hand-set for watch-movements, in combination, a rotating and sliding stem D, an angular-lever E engaging the stem, a spring F backing the lever E, a lever G having a cam-slot engaged by the angular-lever and a sliding-pinion H, H² on and rotating with the stem D and engaged by the cam-slot lever, substantially as described, for the purpose specified.

3. In a stem-wind and hand-set for watch-movements, in combination, a rotating and sliding stem D, an angular-lever E engaging the stem, a lever G having a cam-slot engaged by the angular-lever E and a split end $G^2$, and a sliding-pinion H, H² on and rotating with the stem and engaged by the split end of the cam-slot, substantially as described, for the purpose specified.

4. In a stem-wind and hand-set for watch-movements, in combination, a rotating and sliding stem D, an angular-lever E engaging the stem, a lever G having a cam-slot, with a part to allow of working the case spring, engaged by the angular-lever and a sliding-pinion H, H² on and rotating with the stem and engaged by the cam-slot lever, substantially as described, for the purposes specified.

In testimony whereof we have hereunto set our respective hands in the presence of two subscribing witnesses.

W. M. MATHESON.
M. L. BISHOP.

Witnesses:
ALBERT W. BROWN,
MARION E. BROWN.